United States Patent
Ling et al.

(10) Patent No.: US 11,522,596 B2
(45) Date of Patent: Dec. 6, 2022

(54) BEAM REPORTING

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/276,131

(22) PCT Filed: Sep. 28, 2018

(86) PCT No.: PCT/CN2018/108333
§ 371 (c)(1),
(2) Date: Mar. 13, 2021

(87) PCT Pub. No.: WO2020/062023
PCT Pub. Date: Apr. 2, 2020

(65) Prior Publication Data
US 2022/0052744 A1 Feb. 17, 2022

(51) Int. Cl.
*H04B 7/06* (2006.01)
*H04L 5/00* (2006.01)

(52) U.S. Cl.
CPC ......... *H04B 7/0695* (2013.01); *H04B 7/0626* (2013.01); *H04B 7/0632* (2013.01); *H04B 7/0691* (2013.01); *H04L 5/0051* (2013.01)

(58) Field of Classification Search
CPC .. H04B 7/0695; H04B 7/0626; H04B 7/0632; H04B 7/0691; H04L 5/0051
See application file for complete search history.

(56) References Cited

U.S. PATENT DOCUMENTS

| | | | |
|---|---|---|---|
| 2010/0267341 A1 | 10/2010 | Bergel et al. | |
| 2019/0261349 A1* | 8/2019 | Ren | H04B 7/0452 |
| 2020/0021337 A1* | 1/2020 | Wang | H04B 7/0452 |
| 2020/0120518 A1* | 4/2020 | Geng | H04W 24/02 |

(Continued)

FOREIGN PATENT DOCUMENTS

| | | |
|---|---|---|
| CN | 108023631 A | 2/2018 |
| WO | 2014113565 A1 | 7/2014 |

(Continued)

OTHER PUBLICATIONS

International Searching Authority, "Notification of Transmittal of the International Search Report and the Written Opinion of the International Searching Authority, or the Declaration", PCT/CN2018/108333, dated Sep. 28, 2018, pp. 1-6.

*Primary Examiner* — Kenneth T Lam
(74) *Attorney, Agent, or Firm* — Kunzler Bean & Adamson (57) ABSTRACT

Methods and apparatuses for beam reporting are disclosed. In one embodiment, a base unit comprises: a transmitter that transmits a set of reference signal (RS) resources for beam management to a remote unit; and a receiver that receives an interference report including at least one of inferences of RS resource, contained in the set of the RS resources to an associated RS resource, wherein each RS resource contained in the set of the RS resources is received at the remote unit with a receiver that is the same as the receiver of the associated RS resource.

20 Claims, 4 Drawing Sheets

(56) References Cited

U.S. PATENT DOCUMENTS

| | | | |
|---|---|---|---|
| 2020/0120531 A1* | 4/2020 | Qin | H04W 72/04 |
| 2021/0067233 A1* | 3/2021 | Guan | H04B 7/088 |
| 2021/0067992 A1* | 3/2021 | Kusashima | H04B 17/24 |
| 2021/0068015 A1* | 3/2021 | Yang | H04W 36/04 |
| 2021/0250069 A1* | 8/2021 | Yu | H04B 7/0632 |
| 2021/0345141 A1* | 11/2021 | Cao | H04L 5/0023 |

FOREIGN PATENT DOCUMENTS

| | | |
|---|---|---|
| WO | 2017050210 A1 | 3/2017 |
| WO | 2017097033 A1 | 6/2017 |
| WO | 2018082550 A1 | 5/2018 |

* cited by examiner

BEAM REPORTING

FIELD

The subject matter disclosed herein generally relates to wireless communications and, more particularly, to beam reporting.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Time division multiplexing (TDM), Code division multiplexing (CDM), Orthogonal Cover Code (OCC), Media Access Control-Control Element (MAC-CE), Reference Signal (RS), Channel State Information Reference Signal (CSI-RS), CSI-RS Resource Indicator (CRI), Synchronization Signal Block (SSB), SSB Resource Indicator (SSBRI), Reference Signal Received Power (RSRP), Interference RSRP (I-RSRP), Layer 1 Reference Signal Received Power (L1-RSRP), Signal to Interference and Noise Ratio (SINR), Physical Downlink Control Channel (PDCCH), Transmission Configuration Indication (TCI), Transmission Reception Point (TRP).

A base station may have a plurality of panels each of which may transmit with a plurality of beams. Each resource to be transmitted from base station to UE may be associated with one beam. For one panel, only one beam can be transmitted at a certain time. On the other hand, beams belonging to different panels can be transmitted simultaneously. Accordingly, if the base station has two panels (for example, panel 1 and panel 2), the base station may serve two UEs at the same time using two beams each of which belongs to a different panel. In the above situation, the base station has to determine one beam from panel 1 and another beam from panel 2 to serve two UEs simultaneously. It is very helpful if the base station knows the information on one beam interference with other beams when scheduling multiple UEs with different beams simultaneously.

BRIEF SUMMARY

Methods and apparatuses for beam reporting are disclosed.

In one embodiment, a base unit comprises: a transmitter that transmits a set of reference signal (RS) resources for beam management to a remote unit; and a receiver that receives an interference report including at least one of interferences of RS resources contained in the set of the RS resources to an associated RS resource, wherein each RS resource contained in the set of the RS resources is received at the remote unit with a receiver that is the same as the receiver of the associated RS resource.

In some embodiment, any RS resource contained in the set of RS resources and the associated RS resource can be transmitted simultaneously.

In some embodiment, the associated RS resource may be one of multiple channel state information reference signal (CSI-RS) or synchronization signal block (SSB) resources for beam management reported by the remote unit. Preferably, the associated RS resource may be the CSI-RS or SSB resource which has the largest layer 1 reference signal received power (L1-RSRP). Alternatively, the associated RS resource may be the reference RS contained in the latest transmission configuration indication (TCI) state of the Physical Downlink Control Channel (PDCCH) of the remote unit.

In some embodiment, the set of RS resources may be a set of channel state information reference signal(s) (CSI-RS(s)) and/or synchronization signal block(s) (SSB(s)) for beam management.

In some embodiment, the interference report may be composed of one or more entries, wherein each entry includes an indicator of the RS resource and an associated interference indicator. Preferably, the associated interference indicator may be interference reference signal received power (I-RSRP). Alternatively, the associated interference indicator may be interference and noise ratio (SINR).

In another embodiment, a method comprises: transmitting a set of reference signal (RS) resources for beam management to a remote unit; and receiving an interference report including at least one of interferences of RS resources contained in the set of the RS resources to an associated RS resource, wherein each RS resource contained in the set of the RS resources is received at the remote unit with a receiver that is the same as the receiver of the associated RS resource.

In yet another embodiment, a remote unit comprises: a receiver that receives a set of reference signal (RS) resources for beam management, wherein the receiver is the same as a receiver of an associated RS resource; and a transmitter that transmits an interference report including at least one of interferences of RS resources contained in the set of RS resources to the associated RS resource.

In further embodiment, a method comprises receiving a set of reference signal (RS) resources for beam management, wherein the receiver is the same as a receiver of an associated RS resource; and transmitting an interference report including at least one of interferences of RS resources contained in the set of RS resources to the associated RS resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
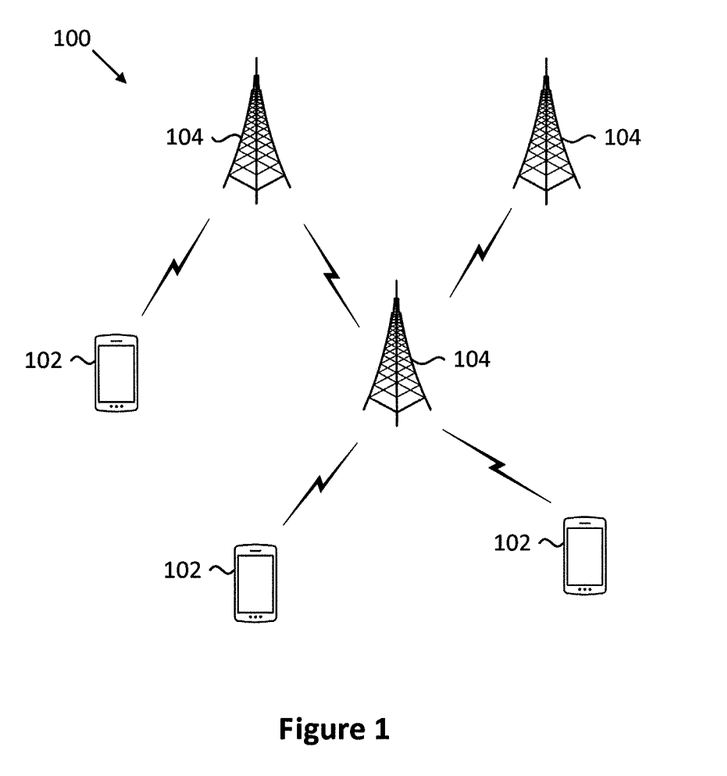
FIG. 1 is a schematic block diagram illustrating one embodiment of a wireless communication system.

FIG. 1 depicts an embodiment of a wireless communication system 100 for beam reporting. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals. A remote unit may connect to a base unit that serves one or more cells.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area. The base units 104 transmit DL communication signals to serve the remote units 102 in the time, frequency, and/or spatial domain.

Figure 2:
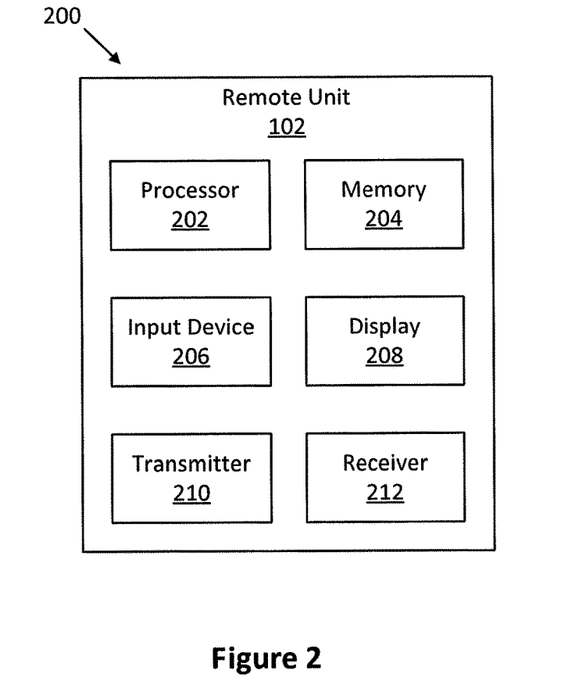
FIG. 2 is a schematic block diagram illustrating one embodiment of an apparatus that may be used for beam reporting.

FIG. 2 depicts one embodiment of an apparatus 200 that may be used for beam reporting. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
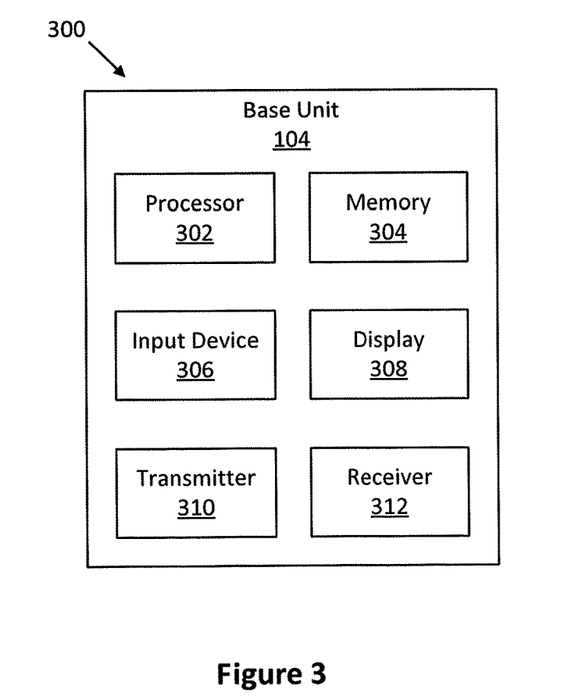
FIG. 3 is a schematic block diagram illustrating one embodiment of another apparatus that may be used for beam reporting.

FIG. 3 depicts one embodiment of an apparatus 300 that may be used for beam reporting. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
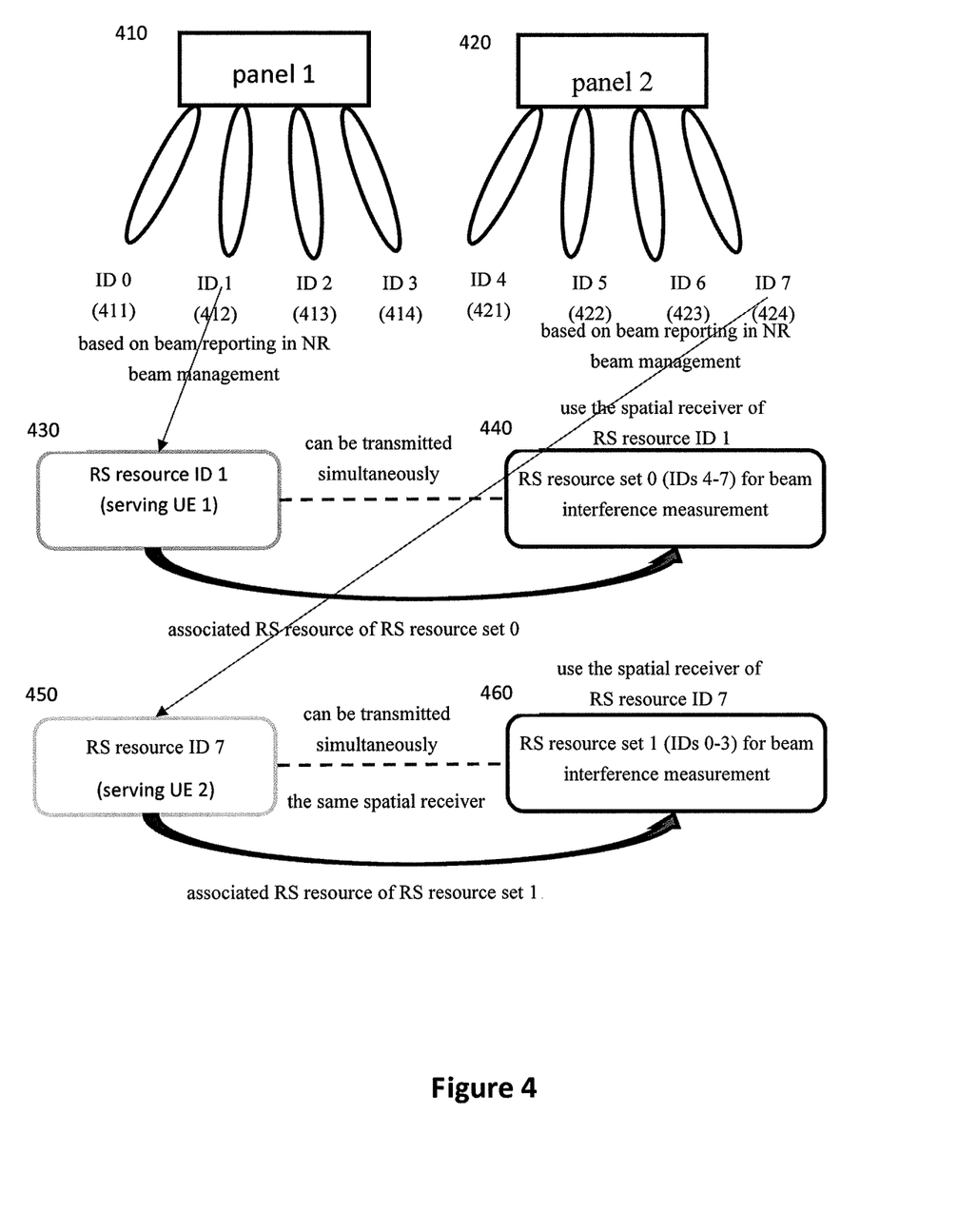
FIG. 4 illustrates RS resource set configuration for beam reporting.

FIG. 4 illustrates reference signal (RS) resource set configuration for beam reporting. The RS resource may be a channel state information reference signal (CSI-RS) resource or a synchronization signal block (SSB) resource. As shown in FIG. 4, a base station has two panels: panel 1 (410) and panel 2 (420). Panel 1 (410) has four beams. Since each beam is associated with one RS resource, the RS resource ID of the one RS resource may represent the beam. That is to say, one RS resource ID may indicate one beam. Therefore, panel 1 (410) has four RS resources with RS resource IDs 0-3 (that may be abbreviated as IDs 0-3 (411-414)). In addition, panel 2 (420) has four RS resources with RS resource IDs 4-7 (that may be abbreviated as IDs 4-7 (421-424)).

A panel may be referred to as a transmission reception point (TRP).

Hereinafter, an ID (i.e. a RS resource ID) may represent a beam associated with the ID. In total, the base unit has totally 8 RS resources in 2 panels with IDs 0-3 (411-414) in panel 1 (410) and IDs 4-7 (421-424) in panel 2 (420).

Only one beam in a panel can be transmitted at a certain time, which means that multiple beams in one panel can't be transmitted simultaneously. Therefore, only one of IDs 0-3 (411-414) can be transmitted at a certain time. On the other hand, any one beam in panel 2 (420) can be transmitted simultaneously with any one beam in panel 1 (410). That is to say, suppose ID 1 (412) is transmitted at a certain time, none of IDs 0, 2 and 3 (411, 413, 414) can be transmitted simultaneously with ID 1 (412) while any one of IDs 4-7 (421-424) may be transmitted simultaneously with ID 1 (412). Similarly, supposed ID 7 (424) is transmitted at a certain time, none of IDs 4-6 (421-423) can be transmitted simultaneously with ID 7 (424) while any one of IDs 0-3 (411-414) may be transmitted simultaneously with ID 7 (424).

If an ID of one panel (e.g. ID 1 (412) of panel 1 (410)) is used to serve a UE (e.g. UE 1), IDs of another panel (e.g. IDs 4-7 (421-424) of panel 2 (420)) may be used to serve another UE (e.g. UE 2). Since only one of IDs of the other panel (e.g. one of IDs 4-7 (421-424)) may be transmitted at a certain time (i.e. only one of IDs of the other panel (e.g. one of IDs 4-7 (421-424)) may be transmitted simultaneously with the ID of said one panel (e.g. ID 1 (412))), one of IDs of the other panel would be determined to serve the other UE (e.g. UE 2).

Because the ID of one panel (e.g. ID 1 (412) of panel 1 (410)) serving the UE 1 and any one of IDs of the other panel (e.g. one of IDs 4-7 (421-424)) serving the UE 2 interfere with each other, it is preferable to choose from the IDs of the other panel (e.g. IDs 4-7 (421-424)) an ID that has the lowest interference (that may be one of IDs 4-7 (421-424)) to the ID of the one panel. To achieve this, the UE 1 is configured to measure the interference of each of IDs of the other panel (e.g. each of IDs 4-7 (421-424)) to the ID of one panel (e.g. ID 1 (412) of panel 1 (410)), and send an interference report including the measured interference to the base station.

The UE (e.g. UE 1) would use the spatial receiver for receiving the RS resource ID 1 (412) to receive each of the RS resource IDs 4-7 (421-424), and measure the interference of IDs 4-7 (421-424) to ID 1 (412). That is to say, the same spatial receiver (i.e. the spatial receiver of the RS resource ID 1 (412)) would be used to receive each of IDs 4-7 (421-424).

Similarly, the UE 2 would use the same spatial receiver (i.e. the spatial receiver of the RS resource ID 7 (424)) to receive each of IDs 0-3 (411-414), and measure the interference of each of IDs 0-3 (411-414) to ID 7 (424).

The interference indicator used to indicate the interference may be configured by the base station through higher layer. For example, the interference indicator may be configured as interference reference signal received power (I-RSRP), or as signal to interference and noise ratio (SINR).

The UE 1 may be configured to only send the interference report including L IDs with lower interferences, in which L is an integer configured by the base station through higher layer.

With the interference report sent from the UE, the base unit may know which one of IDs 4-7 (421-424) has the lowest interference to ID 1 (412). The ID with the lowest interference to ID 1 (412) is preferably chosen as the ID to be transmitted simultaneously with ID 1 (412). Alternatively, any of the IDs with lower interferences with ID 1 (412) may be chosen as the ID to be transmitted simultaneously with ID 1 (412).

In the above example, RS resource IDs 4-7 (421-424) compose a set of RS resources (440). The spatial receiver of RS resource set 0 (440) is the same as the spatial receiver of RS resource ID 1 (430). The RS resource ID 1 (412) may be referred as an associated RS resource with the RS resource set 0 (440).

Similarly, RS resource IDs 0-3 (411-414) compose another set of RS resources (460). The spatial receiver of RS resource set 1 (460) is the same as the spatial receiver of RS resource ID 7 (450). The RS resource ID 7 (424) may be referred as an associated RS resource with the RS resource set 1 (460).

Figure 5:
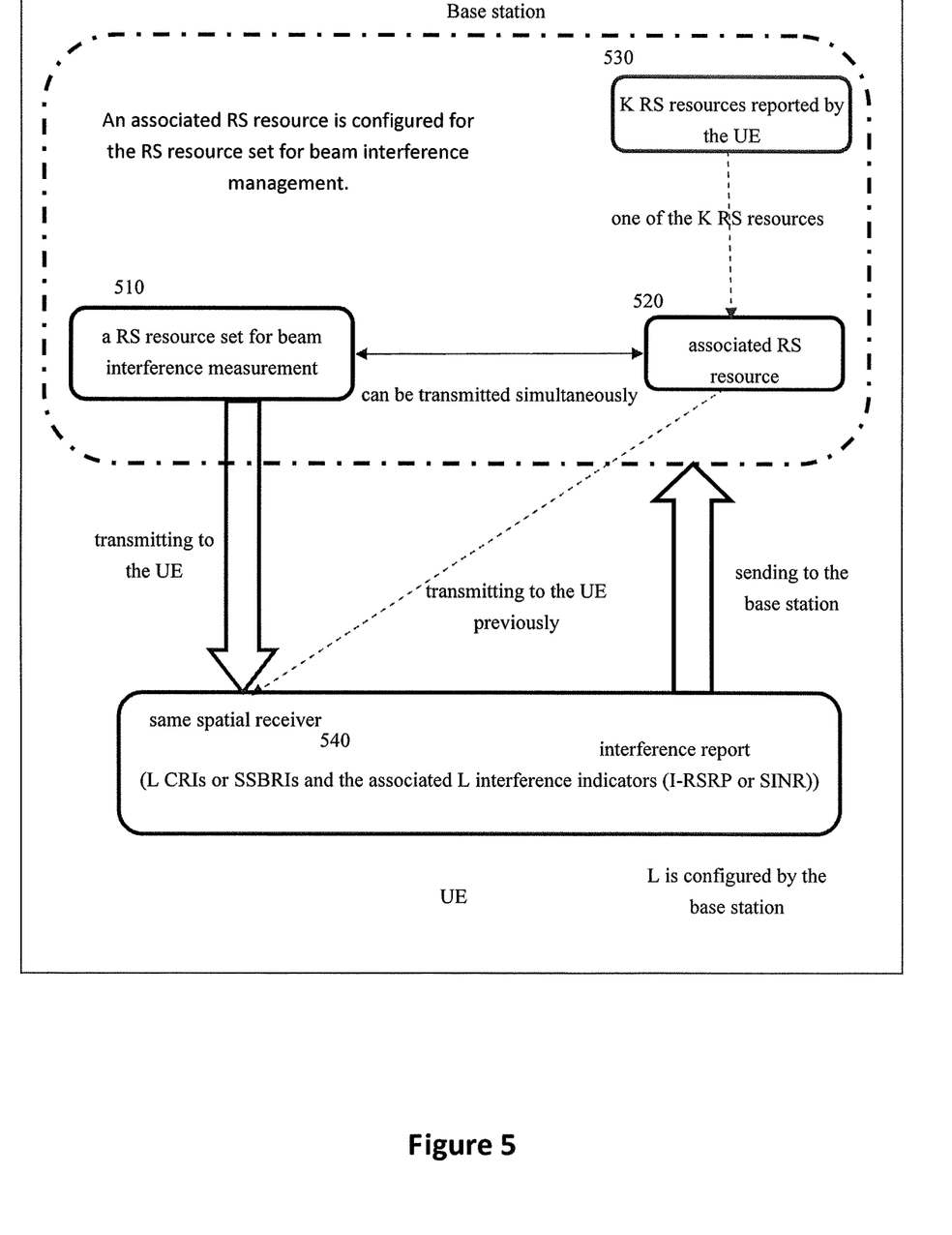
FIG. 5 illustrates a method for beam reporting.

FIG. 5 shows the method of beam reporting.

First, a RS resource set for beam interference measurement (510) is determined. The RS resource set 0 (440) or RS resource set 1 (460) shown in FIG. 4 is an example of the RS resource set.

The associated RS resource (520) with the RS resource set is determined. Preferably, the associated RS resource is chosen from K RS resources (530) reported previously by the UE, wherein K>=1. The K RS resources are the resources that can be transmitted for the UE, which means that each beam associated with each of the K RS resources can be used for transmission to the UE. When the UE reports a RS resource, an indicator of the RS resource (e.g. CRI (CSI-RS Resource Indicator) or SSBRI (SSB Resource Indicator)) and the associated layer 1 reference signal received power (L1-RSRP) are reported to the base station.

One RS resource out of the K RS resources will be configured by the base station as the associated RS resource of the RS resource set.

If no associated RS resource is configured for the RS resource set, a default RS resource will be configured as the associated RS resource. The default RS resource may be the RS resource with the largest L1-RSRP out of the K reported RS resources. Alternatively, the default RS resource may be the reference RS contained in the latest TCI state of the PDCCH of the UE.

Any of the RS resources contained in the RS resource set can be simultaneously transmitted with the associated RS resource. As the RS resources contained in the RS resource set are from one panel, they can't transmit simultaneously together. Therefore, each of the RS resources contained in the RS resource set may be transmitted, respectively, to the UE for measuring the interference.

The UE uses the same spatial receiver (540) (i.e. the spatial receiver used to receive the associated RS resource, which may be referred to as the spatial receiver of the associated RS resource) to receive each RS resource contained in the RS resource set, and measures the interference of each RS resource contained in the RS resource set to the associated RS resource.

Take FIG. 4 as an example, suppose the RS resource set is IDs 4-7 (421-424) and the associated RS resource is ID 1 (412). ID 4 (421) is transmitted to the UE. The UE uses the same spatial receiver (i.e. the receiver to receive ID 1 (412)) to receive ID 4 (421) and measures the interference of the ID 4 (421) to the ID 1 (412). Incidentally, ID 1 (412) has been received previously by the same spatial receiver of the UE before the UE reports K RS resources including the ID 1 (412) to the base station.

Similarly, the UE uses the same spatial receiver (i.e. the receiver to receive ID 1 (412)) to receive other IDs (e.g. IDs 5-7 (422-424)) contained in the RS resource set, respectively, and measures the interference of each of IDs 5-7 (422-424) to ID 1 (412).

As a whole, the UE measures the interference of each RS resource (e.g. each of IDs 4-7 (421-424)) contained in the RS resource set to the associated RS resource (e.g. ID 1 (412)).

The interference indicator used to indicate the interference measured by the UE may be configured by the base station through higher layer. For example, the interference indicator may be configured as I-RSRP (Interference RSRP), or as SINR (Signal to Interference and Noise Ratio).

The base station may configure the number of entries contained in the interference report as L. L may be equal to or less than the number of RS resources contained in the RS resource set. For example, if the RS resource set contains four IDs (e.g. ID 4-7 (421-424)), L is equal to or smaller than 4. Needless to say, L should be at least 1.

So, the interference report includes L indicators of the RS resources (e.g. CRI (CSI-RS Resource Indicator) or SSBRI (SSB Resource Indicator)) and the associated L interference indicators (e.g. I-RSRP or SINR).

If the interference indicator is I-RSRP, L CRIs or SSBRIs and associated L lowest I-RSRP(s) are included in the interference report. If the interference indicator is SINR, L CRIs or SSBRIs and associated L largest SINR(s) are included in the interference report.

The interference report is sent to the base station.

The interference report is related to a RS resource set (e.g. IDs 4-7 (421-424)). Another interference report related to another RS resource set (e.g. IDs 0-3 (411-414)) would be also sent to the base station.

The base station may use the interference reports to determine a pair of UEs to be served simultaneously.

For example, with reference to FIG. 4, RS resource set 0 (440) including IDs 4-7 (421-424) is the RS resource set while ID 1 (412) is the associated RS resource. Suppose L for the RS resource set 0 (440) is configured as 2, UE 1 (served by ID 1 (412)) sends an interference report including 2 RS resources with the lowest interferences, for example, ID 4 (421) and ID7 (424), to the base station. Therefore, ID 1 may be preferably simultaneously transmitted with either ID 4 (421) or ID 7 (424). In addition, RS resource set 1 (460) including IDs 0-3 (411-414) is the RS resource set while ID 7 (424) is the associated RS resource. Suppose L for the RS resource set 1 (460) is configured as 2, UE 2 (served by ID 7 (424)) sends an interference report including 2 RS resources with the lowest interferences, for example, ID 1 (412) and ID 2 (413), to the base station. Therefore, ID 7 (424) may be preferably simultaneously transmitted with either ID 1 (412) or ID 2 (413). As a whole, according to the interference reports sent from UE 1 and UE 2, ID 1 (412) and ID 7 (424) are preferably scheduled to serve UE 1 and UE 2 (i.e. UE pair) simultaneously. With this scheduling, the interference between the UE pair (e.g. UE 1 and UE 2) can be ensured to be low.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base unit comprising:
a transmitter that transmits a set of reference signal resources for beam management to a remote unit; and
a receiver that receives an interference report including at least one interference of reference signal resources contained in the set of the reference signal resources, and an index corresponding to the set of the reference signal resources, wherein each reference signal resource contained in the set of the reference signal resources is received at the remote unit with a receiver that is the same as the receiver of an associated reference signal resource, the interference of each reference signal resource contained in the set of reference signal resources is reported relative to the associated reference signal resource, and any resource of the set of the reference signal resources and the associated reference signal resource are able to be received simultaneously by the remote unit.

2. The base unit of claim 1, wherein, any reference signal resource contained in the set of reference signal resources and the associated reference signal resource can be transmitted simultaneously.

3. The base unit of claim 1, wherein the associated reference signal resource is one of multiple channel state information reference signal or synchronization signal block resources for beam management reported by the remote unit.

4. The base unit of claim 3, wherein the associated reference signal resource is the channel state information reference signal or synchronization signal block resource which has the largest layer 1 reference signal received power.

5. The base unit of claim 1, wherein the set of reference signal resources is a set of channel state information reference signal(s) and/or synchronization signal block(s) for beam management.

6. The base unit of claim 1, wherein the interference report is composed of one or more entries, each entry includes an indicator of the reference signal resource and an associated interference indicator.

7. The base unit of claim 6, wherein the associated interference indicator is signal to interference and noise ratio.

8. A method comprising:
transmitting a set of reference signal resources for beam management to a remote unit; and
receiving an interference report including at least one interference of reference signal resources contained in the set of the reference signal resources, and an index corresponding to the set of the reference signal resources, wherein each reference signal resource contained in the set of the reference signal resources is received at the remote unit with a receiver that is the same as the receiver of an associated reference signal resource, the interference of each reference signal resource contained in the set of reference signal resources is reported relative to the associated reference signal resource, and any resource of the set of the reference signal resources and the associated reference signal resource are able to be received simultaneously by the remote unit.

9. The method of claim 8, wherein, any reference signal resource contained in the set of reference signal resources and the associated reference signal resource can be transmitted simultaneously.

10. The method of claim 8, wherein the associated reference signal resource is one of multiple channel state information reference signal or synchronization signal block resources for beam management reported by the remote unit.

11. The method of claim 10, wherein the associated reference signal resource is the channel state information reference signal or synchronization signal block resource which has the largest layer 1 reference signal received power.

12. The method of claim 8, wherein the set of reference signal resources is a set of channel state information reference signal(s) and/or synchronization signal block(s) for beam management.

13. The method of claim 8, wherein the interference report is composed of one or more entries, each entry includes an indicator of the reference signal resource and an associated interference indicator.

14. The method of claim 13, wherein the associated interference indicator is signal to interference and noise ratio.

15. A method comprising:
receiving a set of reference signal resources for beam management, wherein the receiver is the same as a receiver of an associated reference signal resource; and
transmitting an interference report including at least one interference of reference signal resources contained in the set of reference signal resources, and an index corresponding to the set of the reference signal resources, wherein the interference of each reference signal resource contained in the set of reference signal resources is reported relative to the associated reference signal resource, and any resource of the set of the reference signal resources and the associated reference signal resource are able to be received simultaneously by the remote unit.

16. The method of claim 15, wherein the associated reference signal resource is one of multiple channel state information reference signal or synchronization signal block resources for beam management reported by the remote unit.

17. The method of claim 16, wherein the associated reference signal resource is the channel state information reference signal or synchronization signal block resource which has the largest layer 1 reference signal received power (L1-RSRP).

18. The method of claim 15, wherein the set of reference signal resources is a set of channel state information reference signal(s) and/or synchronization signal block(s) for beam management.

19. The method of claim 15, wherein the interference report is composed of one or more entries, each entry includes an indicator of the reference signal resource and an associated interference indicator.

20. The method of claim 19, wherein the associated interference indicator is signal to interference and noise ratio.

* * * * *